United States Patent
Sanders et al.

(10) Patent No.: US 12,459,040 B2
(45) Date of Patent: Nov. 4, 2025

(54) HYBRID ADDITIVE AND SUBTRACTIVE MANUFACTURING

(71) Applicant: Autodesk, Inc., San Francisco, CA (US)

(72) Inventors: Lee Sanders, Tamworth (GB); Robert Bowerman, Oxford (GB); Kelvin Samuel Allan Hamilton, South Holland (NL)

(73) Assignee: Autodesk, Inc., San Francisco, CA (US)

( * ) Notice: Subject to any disclaimer, the term of this patent is extended or adjusted under 35 U.S.C. 154(b) by 882 days.

(21) Appl. No.: 17/760,746

(22) PCT Filed: Sep. 18, 2020

(86) PCT No.: PCT/US2020/051574
§ 371 (c)(1),
(2) Date: Mar. 15, 2022

(87) PCT Pub. No.: WO2021/055803
PCT Pub. Date: Mar. 25, 2021

(65) Prior Publication Data
US 2022/0379380 A1 Dec. 1, 2022

Related U.S. Application Data

(60) Provisional application No. 62/902,320, filed on Sep. 18, 2019.

(51) Int. Cl.
*B22F 10/80* (2021.01)
*B22F 10/00* (2021.01)
(Continued)

(52) U.S. Cl.
CPC .............. *B22F 10/80* (2021.01); *B22F 10/00* (2021.01); *B33Y 50/00* (2014.12);
(Continued)

(58) Field of Classification Search
CPC ......... B22F 10/00; B33Y 50/00; B33Y 80/00; B33Y 10/00; B33Y 50/02; G05B 19/4099; G05B 2219/35134
See application file for complete search history.

(56) References Cited

U.S. PATENT DOCUMENTS 5,233,150 A    8/1993   Schneebeli et al.
9,581,992 B2   2/2017   Nakano et al.
(Continued)

FOREIGN PATENT DOCUMENTS

CN   103901818 A   7/2014
CN   105538727 A   5/2016
(Continued)

OTHER PUBLICATIONS

Additivemanufacturing.media [online], "Hybrid Machine Combines Milling and Additive Manufacturing", published on Nov. 8, 2013, retrieved on Feb. 22, 2022, retrieved from URL<https://www.additivemanufacturing.media/articles/hybrid-machine-combines-milling-and-additive-manufacturing>, 4 pages.

(Continued)

*Primary Examiner* — Bijan Mapar
(74) *Attorney, Agent, or Firm* — Fish & Richardson P.C.

(57) ABSTRACT

Methods, systems, and apparatus, including medium-encoded computer program products, for computer aided design and manufacture of physical structures using hybrid additive and subtractive manufacturing include, in one aspect, a method including: obtaining data for 3D geometry of a part; simulating at least a portion of a manufacturing process that includes adding first material in a first stage and removing second material in a second, subsequent stage, where the second material includes a portion of the first material, removing the second material includes blending between the material added in the first and second stages, and thermal effects of adding and removing the material in (Continued)

the first and second stages is simulated; and adjusting an amount of the portion based on results of the simulating to prevent deviation of the part from the three dimensional geometry that results in not enough material being available for the blending.

7 Claims, 7 Drawing Sheets

(51) Int. Cl.
  *B33Y 50/00*  (2015.01)
  *B33Y 80/00*  (2015.01)
  *G05B 19/4099*  (2006.01)
(52) U.S. Cl.
  CPC .......... *G05B 19/4099* (2013.01); *B33Y 80/00* (2014.12); *G05B 2219/35134* (2013.01)

(56) References Cited

U.S. PATENT DOCUMENTS

| | | | |
|---|---|---|---|
| 9,694,544 B2* | 7/2017 | Mark | B29C 64/20 |
| 9,950,476 B2 | 4/2018 | Nguyen et al. | |
| 10,274,935 B2* | 4/2019 | Vernon | G05B 19/4099 |
| 2005/0173380 A1 | 8/2005 | Carbone | |
| 2016/0221122 A1 | 8/2016 | D'Orlando et al. | |
| 2017/0107832 A1 | 4/2017 | Roberts et al. | |
| 2017/0129180 A1 | 5/2017 | Coates et al. | |
| 2018/0080325 A1 | 3/2018 | Rettberg et al. | |
| 2018/0221958 A1 | 8/2018 | Torun et al. | |
| 2018/0243866 A1 | 8/2018 | Srinivasan et al. | |
| 2018/0250775 A1* | 9/2018 | Spink | B23K 26/10 |
| 2018/0281115 A1 | 10/2018 | Seince et al. | |
| 2018/0304345 A1 | 10/2018 | Slavens et al. | |
| 2019/0047088 A1 | 2/2019 | Riemann | |
| 2019/0091802 A1 | 3/2019 | Woolridge et al. | |
| 2019/0255555 A1 | 8/2019 | Brennan | |
| 2020/0086424 A1 | 3/2020 | Jones et al. | |

FOREIGN PATENT DOCUMENTS

| | | |
|---|---|---|
| CN | 106624617 A | 5/2017 |
| CN | 106662439 A | 5/2017 |
| CN | 106999962 A | 8/2017 |
| CN | 107745515 A | 3/2018 |
| CN | 107932903 A | 4/2018 |
| CN | 108145164 A | 6/2018 |
| CN | 108480629 | 9/2018 |
| CN | 108334692 | 4/2020 |
| EP | 1296210 | 3/2003 |
| EP | 3034228 | 6/2016 |
| EP | 3053677 | 8/2016 |
| JP | 2017214909 | 12/2017 |
| WO | WO2004065052 | 8/2004 |
| WO | WO2017220058 | 12/2017 |
| WO | WO2017220075 | 12/2017 |
| WO | WO2018078048 | 5/2018 |
| WO | WO2018210957 | 11/2018 |

OTHER PUBLICATIONS

PCT International Search Report and Written Opinion in International Appln. No. PCT/US2020/051574, dated Jan. 12, 2021, 17 pages.

Ruan et al., "Automatic Process Planning and Toolpath Generation of a Multiaxis Hybrid Manufacturing System", Journal of Manufacturing Process, Society of Manufacturing Engineers, Jan. 2005, 7(1):57-68.

Volker et al., "Hybrid Manufacturing of Turbine Components: Laser Metal Deposition (LMD) and Adaptive Repair for Higher Precision and Shorter Production Time", Laser Technik Journal, Apr. 1, 2016, 13(2):44-47.

Wikipedia.org [online], "Machining Vibrations", published on Jan. 17, 2019, retrieved on Feb. 22, 2022, retrieved from URL<https://en.wikipedia.org/w/index/php?title=machining_vibrations&oldid=878934071>, 3 pages.

Zhiyuan et al., "Stereo Vision Based Hybrid Manufacturing Process for Precision Metal Parts", Precision Engineering, Oct. 1, 2015, 42:1-5.

Zhu et al., "A Novel Process Planning Approach for Hybrid Manufacturing Consisting of Additive, Subtractive and Inspection Processes", 2012 IEEE International Conference on Industrial Engineering and Engineering Management, Dec. 10, 2012, pp. 1617-1621.

Office Action in Chinese Appln. No. 202080065853.7, dated Jan. 19, 2025, 29 pages (with English translation).

* cited by examiner

— Finished (or semi-finished) material
---- Transition zone
····· Overbuild ready for next tier

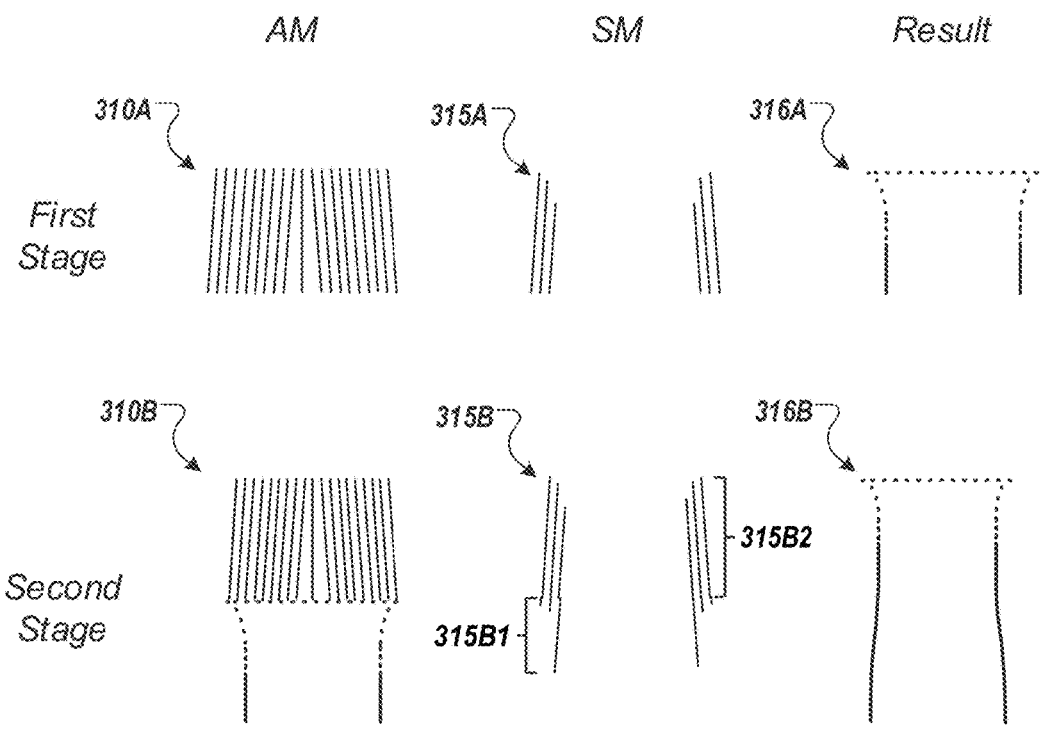
FIG. 3C
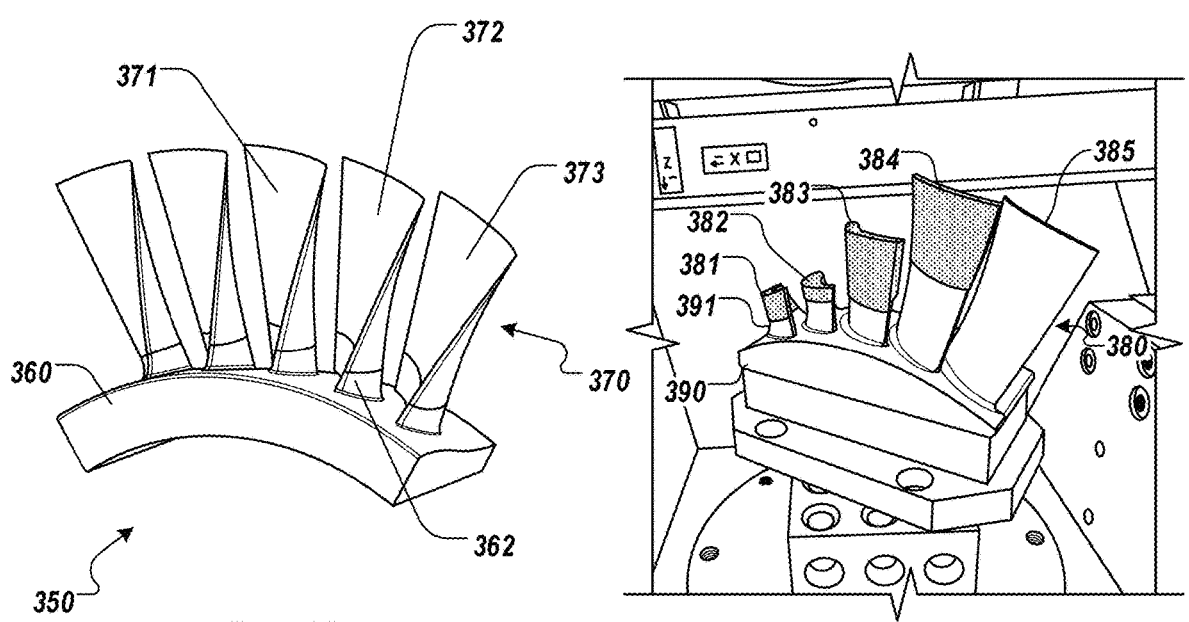
FIG. 3D
FIG. 3E

HYBRID ADDITIVE AND SUBTRACTIVE MANUFACTURING

CROSS-REFERENCE TO RELATED APPLICATIONS

This application claims the benefit of priority of U.S. Patent Application No. 62/902,320, entitled "HYBRID ADDITIVE AND SUBTRACTIVE MANUFACTURING WITH STAINLESS STEEL AND NICKEL ALLOY", filed Sep. 18, 2019.

STATEMENT REGARDING SPONSORED RESEARCH OR DEVELOPMENT

The project leading to this application has received funding from the European Union's Horizon 2020 research and innovation programme under grant agreement No 723538.

BACKGROUND

This specification relates to computer aided design and manufacture of physical structures using additive and subtractive manufacturing systems and techniques.

Computer-aided design software and computer-aided manufacturing software has been developed and used to generate three-dimensional (3D) representations of parts and to manufacture the physical structures of those parts, e.g., using Computer Numerical Control (CNC) manufacturing techniques. Further, additive manufacturing, also known as solid free form fabrication or 3D printing, refers to any manufacturing process where 3D parts are built up from raw material (generally powders, liquids, suspensions, or molten solids) in a series of two-dimensional tiers or cross-sections. An example of additive manufacturing is Fused Filament Fabrication (FFF). A 3D extrusion printer typically uses FFF to lay down material, such as a plastic filament or metal wire, which is unwound from a coil, in tiers to produce a 3D printed part.

In addition, subtractive manufacturing refers to any manufacturing process where 3D parts are created from stock material (generally a "blank" or "workpiece" that is larger than the 3D part) by cutting away portions of the stock material. Such manufacturing processes typically involve the use of multiple CNC machine cutting tools in a series of operations, starting with a roughing operation, an optional semi-finishing operation, and a finishing operation. During roughing operation(s), large portions of the workpiece are cut away quickly (relative to semi-finishing and finishing operations) using cutting tool(s) of the CNC machining system in order to approximate the final shape of the part being manufactured. Moreover, hybrid manufacturing systems have been developed, where additive and subtractive manufacturing are combined, such as a CNC machine that combines laser metal deposition with high-precision 5-axes adaptive milling.

SUMMARY

This specification describes technologies relating to computer aided design and manufacture of physical structures using hybrid additive and subtractive manufacturing systems and techniques.

In general, one or more aspects of the subject matter described in this specification can be embodied in one or more methods that include: obtaining data for three dimensional geometry of a part to be manufactured from a material by a hybrid additive and subtractive manufacturing system including an additive manufacturing tool and a subtractive manufacturing tool using a manufacturing process including a series of two or more stages, each of the two or more stages including adding the material with the additive manufacturing tool and removing some of the material with the subtractive manufacturing tool; simulating, in accordance with the data and a physical property of the material, at least a portion of the manufacturing process that includes adding first material using the additive manufacturing tool in a first stage of the two or more stages and removing second material using the subtractive manufacturing tool in a second stage of the two or more stages, wherein the first stage precedes the second stage, wherein the second material includes a portion of the first material, wherein removing the second material includes blending between the material added in the first and second stages, and wherein the simulating includes simulating thermal effects of adding and removing the material in the first and second stages; adjusting an amount of the portion of the first material included in the second material based on results of the simulating, in accordance with the physical property of the material, to prevent deviation of the part from the three dimensional geometry, during the portion of the manufacturing process, that results in not enough material being available for the blending; and providing the adjusted amount for use in manufacturing the part by the hybrid additive and subtractive manufacturing system.

The portion of the manufacturing process can include adding third material using the additive manufacturing tool in the second stage of the two or more stages and removing fourth material using the subtractive manufacturing tool in the first stage of the two or more stages, where the first material includes the fourth material, the second material includes a portion of the third material, the simulating includes simulating vibration experienced during at least the removing of the second material, and the method includes modifying the two or more tiers and thus the two or more stages responsive to the vibration being excessive. Simulating vibration can include simulating instability during cutting based on predicted cutting forces and dynamic response.

Adjusting the amount of the portion of the first material included in the second material can include increasing an overbuild amount of the first material, in relation to the three dimensional geometry of the part, to be added using the additive manufacturing tool in the first stage of the two or more stages.

The portion of the manufacturing process can include adding third material using the additive manufacturing tool in the second stage of the two or more stages and removing fourth material using the subtractive manufacturing tool in the first stage of the two or more stages, where the first material includes the fourth material, the second material includes a portion of the third material, and adjusting the amount of the portion of the first material included in the second material includes decreasing an amount of the fourth material and increasing the portion of the first material included in the second material.

The part can be a turbine rotor including a hub and blades designed to operate in a high temperature environment, and the simulating can include simulating machining of the blades built with the additive manufacturing tool, in the two or more stages, on top of blade roots included as integral portions of the hub.

The method can include manufacturing the part with the hybrid additive and subtractive manufacturing system. The hybrid additive and subtractive manufacturing system can include one or more computer processing apparatus including at least one non-transitory computer-readable medium encoding a computer aided design program operable to perform the obtaining, the simulating, the adjusting, the providing, and the manufacturing.

The described method(s) can be implemented using a non-transitory computer-readable medium encoding instructions operable to cause data processing apparatus to perform operations of the method(s). Moreover, system implementations can include the data processing apparatus (including at least one hardware processor) and the non-transitory computer-readable medium encoding instructions of a computer-aided design program that implements the method(s). Finally, the system implementations can include the hybrid additive and subtractive manufacturing system, and the instructions of the computer-aided design program can be configured to cause the data processing apparatus to manufacture the part with the hybrid additive and subtractive manufacturing system.

Particular embodiments of the subject matter described in this specification can be implemented to realize one or more of the following advantages. Building a structure in a series of tiers in respective additive-plus-subtractive manufacturing stages, allows the use of shorter and/or more conventional tools, which reduces manufacturing costs for complex structures. Feedback from numerical simulation of the combination of additive and subtractive manufacturing can be used to alter a manufacturing plan so as to improve the manufacturing process and/or improve the quality of the manufactured structure.

The number of manufacturing stages and/or the overlap between additive subtractive manufacturing within and between stages can be modified to prevent undesirable instability and distortion during additive deposition, ensure uniform material removal during machining, and/or provide stability against vibration and machining dynamics during subtractive machining. Excessive vibration during subtractive manufacturing (which can damage the workpiece and/or the tools) can be avoided using the systems and techniques described in this document, e.g., informed by a cutting force and dynamic prediction model used by the numerical simulation, thus avoiding part inaccuracies, tool damage/breakage, and potentially having to scrap the workpiece entirely.

The number of (and/or distance covered by) hybrid manufacturing stages can be modified, and how much respective additive and subtractive manufacturing are to be done in each stage can be adjusted, based on the part being built, the length and strength of the available tools and on numerical simulation of the manufacturing process (e.g., the length and strength of cutting tools, and thus the expected amount of vibration during subtractive manufacturing) and a desire to minimize manufacturing interruptions caused by transitions between additive and subtractive manufacturing. Use of the hybrid staged manufacturing systems and techniques described in this document can result in a reduction of material used to build a part, a reduction of machine time needed to manufacture a part. These and other advantages can be realized in a single setup hybrid production process.

Moreover, the staged hybrid approach facilitates the use of more convention tooling (stiffer and off-the-shelf) rather than specialized tooling (long, slender and expensive). This means resources that would otherwise be spent on designing and sourcing specialized tooling can be spent on the manufacturing itself, increasing productivity. Further, using a simulation backed digital workflow as described in this document can reduce the need for specialist knowledge and guess work in complex manufacturing projects.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 3B-3E show detailed examples as can be implemented in the hybrid additive and subtractive manufacturing planning process of FIG. 3A.

Like reference numbers and designations in the various drawings indicate like elements.

DETAILED DESCRIPTION

Figure 1:
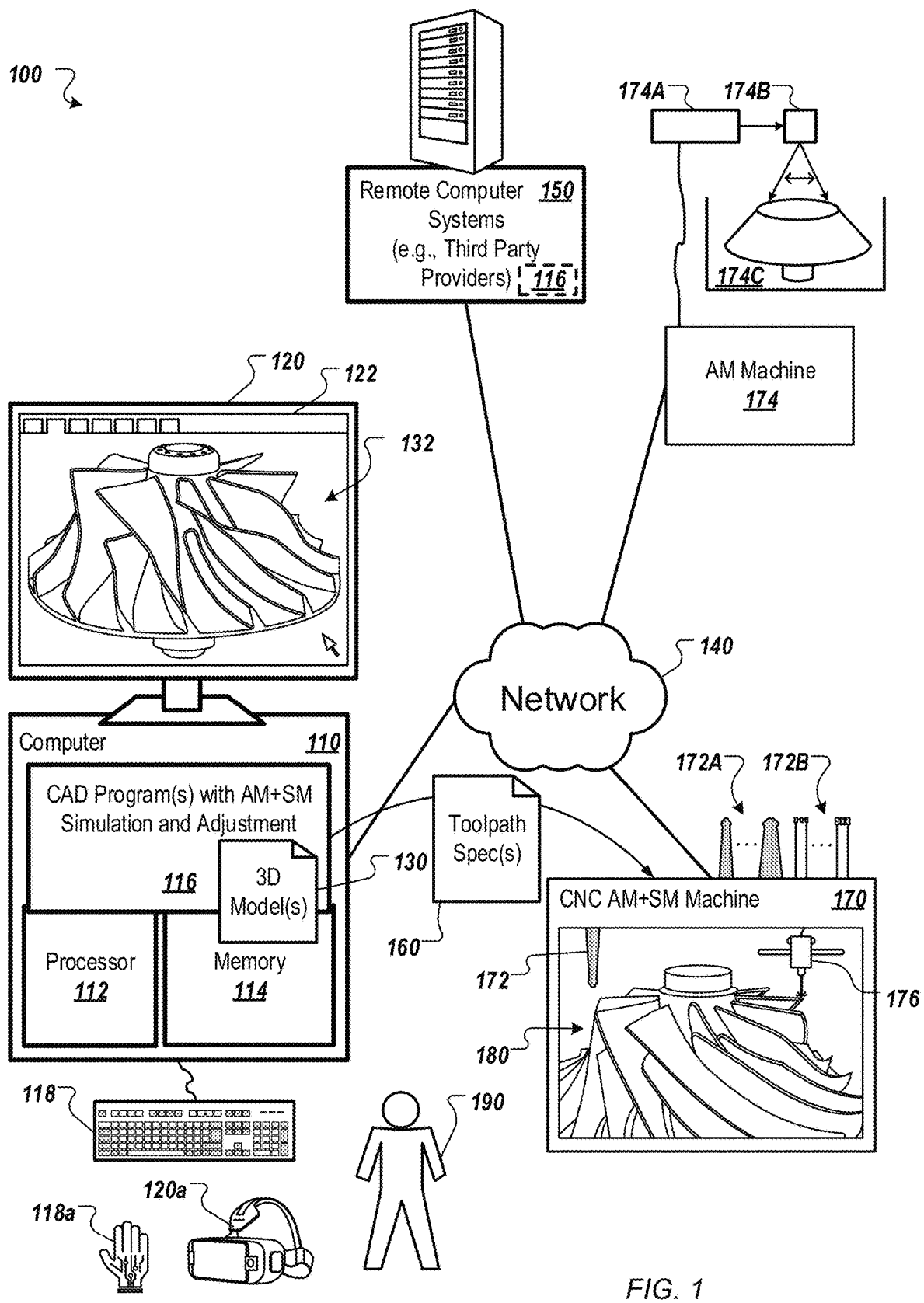
FIG. 1 shows an example of a system usable to design and manufacture physical structures using hybrid additive and subtractive manufacturing.

FIG. 1 shows an example of a system 100 usable to design and manufacture physical structures using hybrid additive and subtractive manufacturing. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs include one or more three-dimensional (3D) modeling, simulation (finite element analysis or other) and/or manufacturing control programs, such as Computer Aided Design (CAD) program(s) 116, which simulates the combination of additive and subtractive manufacturing and adjusts a manufacturing plan (during 3D modelling of the structure/object, and/or during generation of toolpath specifications from a 3D model) to improve hybrid additive and subtractive manufacturing of the structure/object. As used herein, "CAD" refers to any suitable program used to design a manufacturing plan for a physical structure, regardless of whether or not the program is capable of interfacing with and/or controlling manufacturing equipment to build the physical structure, and regardless of whether or not the program can be used to design physical structures that meet design requirements. Thus, CAD program(s) 116 can include Computer Aided Engineering (CAE) program(s), Computer Aided Manufacturing (CAM) program(s), Architecture, Engineering and Construction (AEC) program(s), etc.

The CAD program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., numerical simulation operations) "to the cloud" by having one or more programs 116 on one or more computers 150 perform the offloaded processing operations.

The CAD program(s) 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer or in a virtual reality (VR) or augmented reality (AR) system. For example, the input/output devices 118, 120 can include a VR input glove 118a and a VR headset 120a.

A user 190 can interact with the CAD program(s) 116 to create and/or load a 3D model 132 (e.g., in and/or from a document 130) of a part to be manufactured using a hybrid additive and subtractive manufacturing system, which can include one or more Computer Numerical Control (CNC) manufacturing machines 170. This can be done using known graphical user interface tools, and the 3D model 132 can be defined in the computer using various known 3D modeling formats, such as using solid models (e.g., voxels) or surface models (e.g., B-Rep (Boundary Representation) and surface meshes). In addition, in some implementations, the user 190 can interact with the program(s) 116 to modify the 3D model 132 of the part, as needed.

In the example shown, the model 132 is a 3D model of a particular turbine wheel, but many different types of models can be used with the systems and techniques described in this document. In general, the described systems and techniques are more applicable to manufacturing components that include tall structures with small amounts of space between them, such as the blades of a blisk or turbine wheel (or vanes on a rotor) for aerospace or power generation applications, where the blades are often close together in comparison to their height. The hybrid manufacturing described in this document involves building such structures in a series of tiers in respective manufacturing stages, where each stage includes both depositing material and removing material, which means shorter tools can be used when manufacturing the blades that are close together, as only the height of the current tier need be spanned, rather than the height of the entire blade. Nonetheless, despite this particular applicability to manufacturing tall structures with limited amounts of space between them, the described systems and techniques can also be applied more generally to various types of structures to be designed and manufactured using CAD program(s) and hybrid additive and subtractive manufacturing.

In some implementations, the hybrid additive and subtractive manufacturing system is a single CNC machine 170, which includes both a subtractive manufacturing (SM) tool 172 and an additive manufacturing (AM) tool 176, which may be removable and/or have removable tool heads. As will be appreciated, there are many different types of cutting tools 172 that may be available in the CNC machine 170, including milling cutter tools with various ball nose, tapered, tip radius and barrel shapes. These different cutting tools 172 can include solid tools having different diameters and tip radius (e.g., solid carbide round tools) that create different cutting surface geometries for the tools 172 and/or insert tools having different diameters and metal (e.g., carbide) inserts that create different cutting surface shapes for the tools 172. These different tools 172 can be arranged in tool families, where a tool family has one or more shared tool characteristics (e.g., a family 172A of solid carbide round tools having different diameters and tip radius that create the different cutting surface geometries, and a family 172B of insert tools having different diameters and metal inserts that create different cutting surface geometries). In addition, the CNC machine 170 can include other components and systems, such as rotatable platforms/attachments (e.g., for five-axis milling processes) and cleaning and cooling systems (e.g., sprayed water cleaning and cooling systems).

Furthermore, various different types of AM tools 176 may be available in the CNC machine 170. For example, the CNC machine 170 can include one or more AM tools 176 that employ granular additive manufacturing techniques, such as Selective Laser Sintering (SLS) or Direct Metal Laser Sintering (DMLS). As another example, the CNC machine 170 can include one or more AM tools 176 that employ extrusion techniques, e.g., Fused Filament Fabrication (FFF). Other AM systems and techniques are also usable, such as using Directed Energy Deposition (DED) as the metal additive process, where the power source can be electric arc, laser or electron beam. Moreover, the AM tool(s) 176 can be designed to use powder or wire material feedstock.

In some implementations, the hybrid additive and subtractive manufacturing system is composed of two or more CNC machines, which can be the same or different from each other. In some cases, the SM tool(s) 172 and the AM tool(s) 176 are kept in separate CNC machines, rather than being combined in a single machine. Thus, the machine 170 can be a CNC SM machine with cutting tool(s) 172 that does not include AM tool(s) 176. But regardless of whether or not the CNC machine 170 includes AM tool(s) 176, the SM tool(s) 172 of the CNC machine 170 can provide multi-axis and multi-tool milling capabilities.

A separate CNC AM machine 174 can include the AM tool(s) 176. For example, the AM machine 174 can include a laser 174A (e.g., a CO2 laser) and a scanner 174B (e.g., galvanometers or a rotating polygonal mirror) to build a semi-finished structure in a powder bed 174C using powder delivery and piston mechanisms (not shown). Alternatively, the laser 174A can be attached to a 2.5, 3 or more-axis motion control device to perform laser cladding at specified locations, using powder or wire material feedstock. As will be appreciated, implementations that use separate CNC machines for the SM and AM tools may require extra steps or devices to transfer a workpiece from one machine to another, such as a part handling robot to move the workpiece between the separate CNC machines 170, 174. Alternatively, such implementations may use a common workpiece platform to which the separate CNC machines 170, 174 have shared access.

Thus, regardless of whether or not the hybrid additive and subtractive manufacturing system is a single AM+SM machine 170, or separate AM & SM machines 174, 170, a single setup hybrid production process can be employed, i.e., the workpiece can be fixtured once to a working pallet (or other object to which the workpiece is clamped or otherwise held fixed in position) and then the sequence of manufacturing stages (with each of the SM plus AM operations therein) can be performed on the workpiece to form the desired part from the workpiece, without having to unfixture the workpiece during the sequence of manufacturing stages. For example, a single AM+SM machine 170 can include a fixturing pallet system and a clamping system provided by Erowa A G of Büron Switzerland (or another company) in a hybrid machine provided by Hamuel Maschinenbau GmbH & Co. KG of Meeder Germany (or another company) that includes in-process measuring devices. For more details regarding hybrid additive and subtractive manufacturing systems, see U.S. Patent Nos. US20160221122A1, US20170129180A1 and US20portion 200086424A1, which are hereby incorporated by reference. But despite these potential variations in the manufacturing system to be used, the systems and techniques described in this document for implementation by CAD program(s) 116 are applicable to these variations in the number of machines (and capabilities thereof) to be used for hybrid AM+SM manufacturing.

As noted above, the CAD program(s) 116 simulate the combination of additive and subtractive manufacturing and adjust the manufacturing plan to improve hybrid additive and subtractive manufacturing of the structure/object. In particular, numerical simulation of one or more physical properties of one or more materials used to build the structure during the additive and subtractive manufacturing processes can be performed to provide feedback used to adjust the mixing and matching of the additive and subtractive manufacturing operations. Note that the adjustments made can include modifications of the 3D model of the structure/object and/or modifications of toolpath specifications generated (for AM, SM, or both) from the 3D model of the structure/object.

In the example shown, the 3D model 132 is of a blisk 180, which is a physical object to be built using the hybrid additive and subtractive manufacturing system. The blisk 180 includes multiple blades that are close together in comparison to their height. For example, the blades may be 120 millimeters long and be separated from each other by a distance of around 9 millimeters at the tops of the blades and by a distance of about 2 millimeters where the blades connect with the hub of the blisk 180. Thus, milling the blisk 180 from an additively manufactured workpiece may require specialized cutting tools, which are both long and thin enough to reach all the crevices in the design of the blisk 180.

But longer and thinner cutting tools generally produce more vibration, which can make the machining process unstable, can produce scuff marks that need to be cleaned up with more finishing operations, and can result in more tool breakage. One solution for this problem is to build the cutting tools from stronger, more exotic materials, which do not vibrate as much, but this adds to costs. Note that the longer and thinner the machine tool is, the more vibration it tends to introduce, which leads to more tool breakage and more potential for damage to the part being manufactured, or leads to slower manufacturing when the machine tool is used more cautiously so as to avoid tool breakage and damage to the part.

Another solution is to build the blades of the blisk 180 in a series of tiers in respective manufacturing stages, where each stage includes both depositing material with AM tool(s) 176 and removing material with SM tool(s) 172. This allows the use of shorter and/or more conventional tools for the manufacturing, which reduces costs. In addition, using the systems and techniques described in this document can prevent instability and undesirable distortion during AM and/or SM processes while building the part.

Figure 2A:
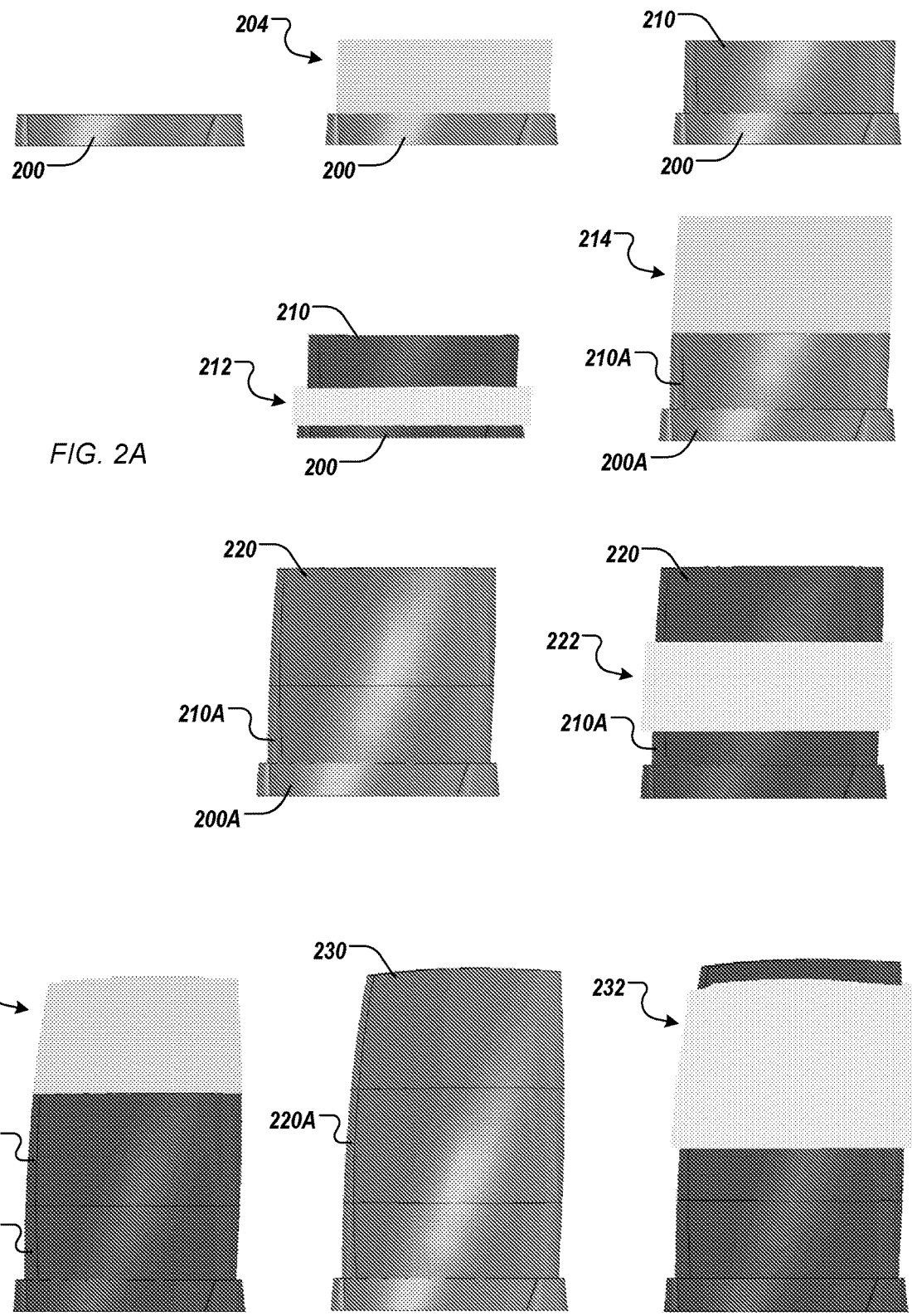
FIGS. 2A & 2B show an example of a building sequence for a blade manufactured using hybrid additive and subtractive manufacturing.

FIG. 2A shows an example of a building sequence for a blade manufactured using hybrid additive and subtractive manufacturing in a series of three tiers. A hub portion 200 represents a portion of a structure on which the blade will be manufactured. The hub portion 200 can be a previously manufactured piece, e.g., by casting or forging (hot or cold) and/or by traditional SM roughing operations performed on a block of starting material, or the hub portion 200 can be manufactured using the one or more AM tools and the one or more SM tools included in the hybrid additive and subtractive manufacturing system. In any case, a first tier 210 of the blade is built by a deposition process 204 that uses the one or more AM tools in the hybrid additive and subtractive manufacturing system (e.g., using a laser head and measuring system 176 with a 1 kW fiber laser source, which builds the first tier 210 using melted metal powder from a powder supply system).

Then a machining process 212 is performed using the one or more SM tools in the hybrid additive and subtractive manufacturing system (e.g., using high-precision and dynamic 5-axis simultaneous machining with adaptive milling). Note that the machining process 212 covers a portion of the hub portion 200 and a portion of the first tier 210 of the blade being manufactured, producing a partially machined hub portion 200A (or a fully machined hub portion 200A if prior machining was done) and a partially machined first tier 210A of the blade. Thus, at a minimum, the machining process 212 blends the first tier 210 into the hub portion 200.

However, in some implementations, the machining process 212 covers more (or all) of the hub portion 200. Even so, the machining process 212 should only cover part of the first tier 210, thereby leaving behind some unfinished portion of the first tier 210 on which to build a next tier. The machining process 212 can include both semi-finishing and finishing operations. In some implementations, the machining process 212 includes semi-finishing the entirety of the first tier 210 of the blade and at least a portion of the hub portion 200, followed by finishing the at least a portion of the hub portion 200 and only a portion of the first tier 210, thus leaving behind some unfinished portion of the first tier 210 on which to build a next tier. In some implementations, the machining process 212 includes semi-finishing a first portion of the first tier 210 of the blade and at least a portion of the hub portion 200, followed by finishing the at least a portion of the hub portion 200 and only a second portion of the first tier 210, where the second portion is less than the first portion, thus leaving behind a non-finished (rough) portion above the first portion of the first tier 210 on which to build a next tier, and also leaving behind an unfinished portion of the first tier 210 above the second portion to facilitate subsequent machining operations, including blending between the different tiers of the blade.

A second tier 220 of the blade is built on top of the partially machined first tier 210A by a deposition process 214 that uses the one or more AM tools in the hybrid additive and subtractive manufacturing system. Then a machining process 222 is performed using the one or more SM tools in the hybrid additive and subtractive manufacturing system. The machining process 222, at a minimum, blends the second tier 220 into the partially machined first tier 210A, and so the machining process 222 can complete the manufacturing of the first tier of the blade, producing a fully machined first tier 210B.

But the machining process 222 only covers a portion of the second tier 220 of the blade being manufactured, producing a partially machined second tier 220A of the blade and leaving behind some unfinished portion of the second tier 220 on which to build a next tier. As with the machining process 212, the machining process 222 can include both semi-finishing and finishing operations. In some implementations, the machining process 222 includes semi-finishing the entirety of the second tier 220 and a portion of the partially machined first tier 210A, followed by finishing the portion of the partially machined first tier 210A and only a portion of the second tier 220, thus leaving behind some unfinished portion of the second tier 220 on which to build a next tier. In some implementations, the machining process 222 includes semi-finishing a first portion of the second tier 220 and a portion of the partially machined first tier 210A, followed by finishing the portion of the partially machined first tier 210A and only a second portion of the second tier 220, where the second portion is less than the first portion, thus leaving behind a non-finished (rough) portion above the first portion of the second tier 220 on which to build a next tier, and also leaving behind an unfinished portion of the second tier 220 above the second portion to facilitate subsequent machining operations, including blending between the second tier 220 and the partially machined first tier 210A.

A third tier 230 of the blade is built on top of the partially machined second tier 220A by a deposition process 224 that uses the one or more AM tools in the hybrid additive and subtractive manufacturing system. Then a machining process 232 is performed using the one or more SM tools in the hybrid additive and subtractive manufacturing system. The machining process 232, at a minimum, blends the third tier 230 into the partially machined second tier 220A, and so the machining process 232 can complete the manufacturing of the second tier of the blade, producing a fully machined second tier.

Figure 2B:
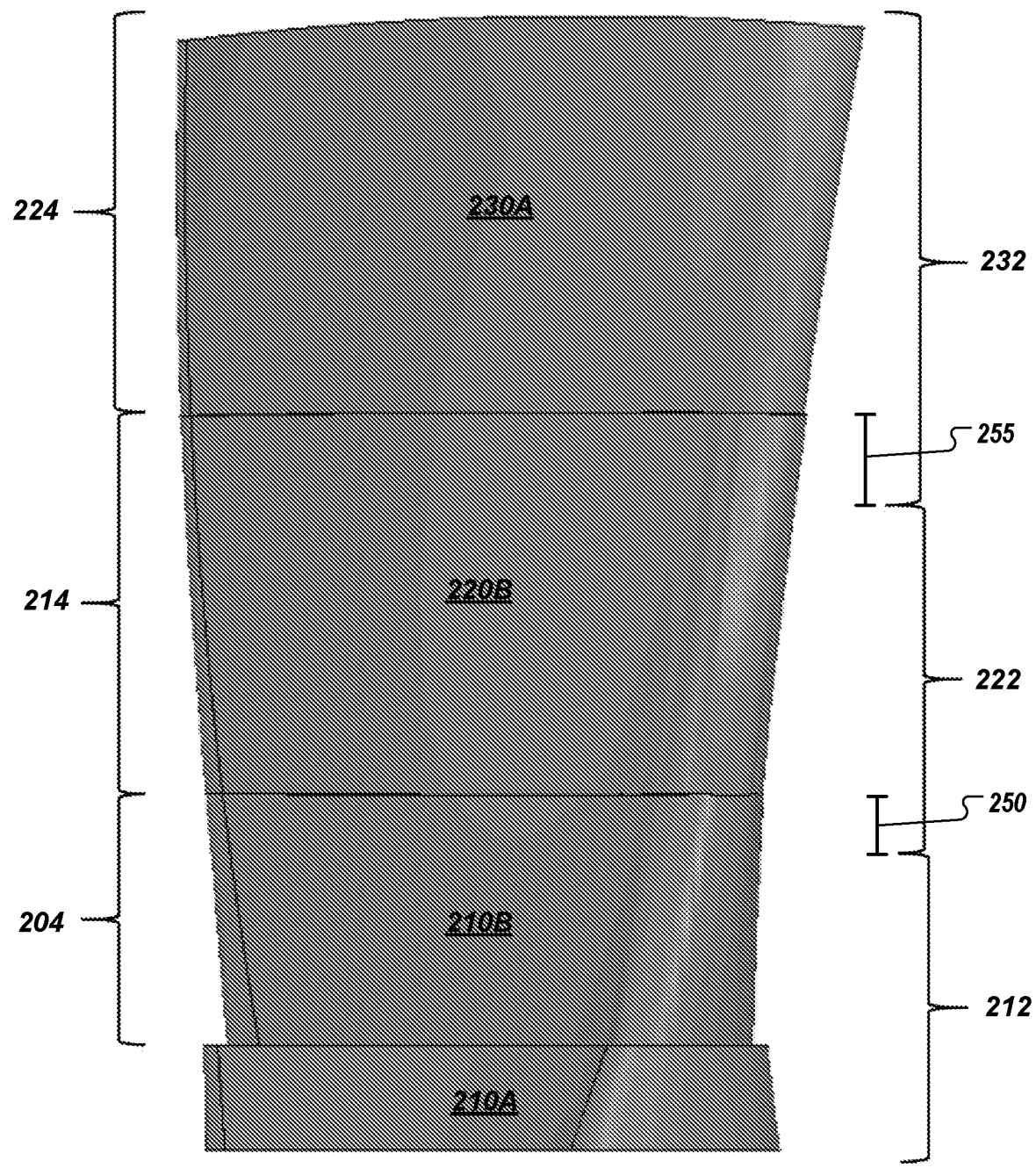

In some cases, the machining process 232 only covers a portion of the third tier 230 of the blade being manufactured, as shown in FIG. 2A, producing a partially machined third tier of the blade, e.g., to leave behind some unfinished portion of the third tier 230 on which to build a next tier. But if the third tier 230 is the final tier of the blade, then the machining process 232 can cover the entirety of the third tier 230 of the blade, as shown in FIG. 2B. And as with the machining process 222, the machining process 232 can include both semi-finishing and finishing operations.

FIG. 2B shows the fully manufactured blade for the building sequence example of FIG. 2A. The fully machined first tier 210B is built on top of the hub portion 210A using three separate manufacturing processes that span two distinct manufacturing stages. In a first manufacturing stage, the first tier of the blade is built (additively) by the deposition process 204, and then a portion of the first tier of the blade is built (subtractively) by the machining process 212. Note that the AM and SM tools need only accommodate the height of the first tier of the blade, and not the entire height of the blade, when the hybrid staged manufacturing process is used.

Then, in a second manufacturing stage, the machining process 222 completes the fully machined first tier 210B since the first tier of the blade is built (subtractively) by the machining process 222. In other words, three separate processes 204, 212, 222 performed in two distinct manufacturing stages (the first being manufacturing the first tier, and the second being manufacturing the second tier) are used to complete the first tier of the blade. Similarly, a fully machined second tier 220B is built on top of the fully machined first tier 210B using three separate manufacturing processes that span two distinct manufacturing stages, but with overlap with the first tier. Thus, three separate processes 214, 222, 232 performed in two distinct manufacturing stages (the first being manufacturing the second tier, and the second being manufacturing the third tier) are used to complete the second tier of the blade.

However, the final tier of the blade only needs two separate processes in a single manufacturing stage, namely, the deposition process 224 and the machining process 232 are performed in the third tier manufacturing stage to complete the third tier 230A of the blade. Other processes can also be included in the respective manufacturing stages. Also, note that the respective first, second and third manufacturing stages can include building the first, second and third tiers of multiple other blades that attach to the same hub. In addition, the number of manufacturing stages need not be three, and in some implementations, the CAD program(s) 116 determine how many tiers are desirable, as described in further detail below in connection with FIG. 3A. But regardless of the total number of tiers and thus the number of manufacturing stages, there will be one or more overlaps 250, 255 between separate manufacturing stages with respect to the part being built.

The overlaps 250, 255 result from the offsetting of the machining processes 212, 222, 232 from the separate tiers of the blade that are built by the deposition processes 204, 214, 224, as shown in FIG. 2B. Thus, the overlap 250 is the difference between the end point of the deposition process 204 and the end of the machining process 212 (or the beginning of the machining process 222). Likewise, the overlap 255 is the difference between the end point of the deposition process 214 and the end of the machining process 222 (or the beginning of the machining process 232). But the size of the overlaps 250, 255 can be varied depending on the particular part to be manufactured so as to improve the hybrid manufacturing of the part.

For example, the numerical simulation of the machining processes 222, 232 can include simulating thermal effects of AM operations in relation to the SM operations, which will need enough material for blending between, respectively, the partially machined first tier 210A and the deposited second tier 220, and the partially machined second tier 220A and the deposited third tier 230. Due to the tiered manufacturing process being used, some thermal effects at the interface between the two tiers (and potentially at a global part level) can cause the part to move or distort during the manufacturing. To address this issue, a sufficient amount of the deposited first tier 210 should be left in the partially machined first tier 210A (during the machining process 212) to absorb the heat and prevent any (or too much) movement or distortion during the adding 214 of the second tier 220, thereby avoiding there not being enough material in the right place to successfully complete the machining process 222, including the blending between the first and second tiers. Likewise, a sufficient amount of the deposited second tier 220 should be left in the partially machined second tier 220A (during the machining process 222) to absorb the heat and prevent any (or too much) movement or distortion during the adding 224 of the third tier 230, thereby avoiding there not being enough material in the right place to successfully complete the machining process 232, including the blending between the second and third tiers Thus, numerical simulation of the deposition processes 214, 224 and/or the machining processes 222, 232 can reveal that one or both of the overlaps 250, 255 need to be adjusted (increased or decreased in size, potentially by different amount in different regions of the part) to facilitate the blending performed during the machining processes 222, 232. Moreover, numerical simulation of the processes 214, 222, 224, 232 can reveal that an overbuild amount needs to be adjusted (increased or decreased in size, potentially by different amount in different regions of the part) as described in further detail below in connection with FIGS. 2C and 3A. As will be appreciated, the results of the numerical simulation will depend on a physical property of the material being used to manufacture the part. Different materials (including different metal alloys, such as a stainless steel and nickel alloy) will have different strengths and stability when new melted material is added thereon, and when the deposited material is machined by a given type of cutting tool. Thus, more or less material will need to be left on the part in one of the stages to ensure stability and avoid deviation during the hybrid, staged manufacturing process.

Additional numerical simulation(s) can be done, and additional modifications can be made to the hybrid manufacturing process based on feedback from the simulation(s). Nonetheless, an amount of a portion of material that is deposited by AM in one tier during a preceding one of the manufacturing stages, which portion is then removed by SM performed mostly on another (higher) tier during a subsequent one of the manufacturing stages, is adjusted based on results of the numerical simulation. The "amount" that is adjusted can include the size of the overlap between the subsequent manufacturing stage and the preceding manufacturing stage (e.g., the size of one or both of overlaps 250, 255), the extent of material deposited (beyond the envelope of the 3D geometry of the part, i.e., the overbuild amount) in at least the overlap region between the subsequent manufacturing stage and the preceding manufacturing stage (e.g., the amount of material deposited 204, 214 beyond the exterior surface of the blade, in at least the region of one or both of overlaps 250, 255), or both the size of the overlap and the extent of the material deposited. Note also that the extent of material deposited in a given tier (the overbuild amount) is important for providing sufficient support for depositing a higher tier thereon.

Figure 2C:
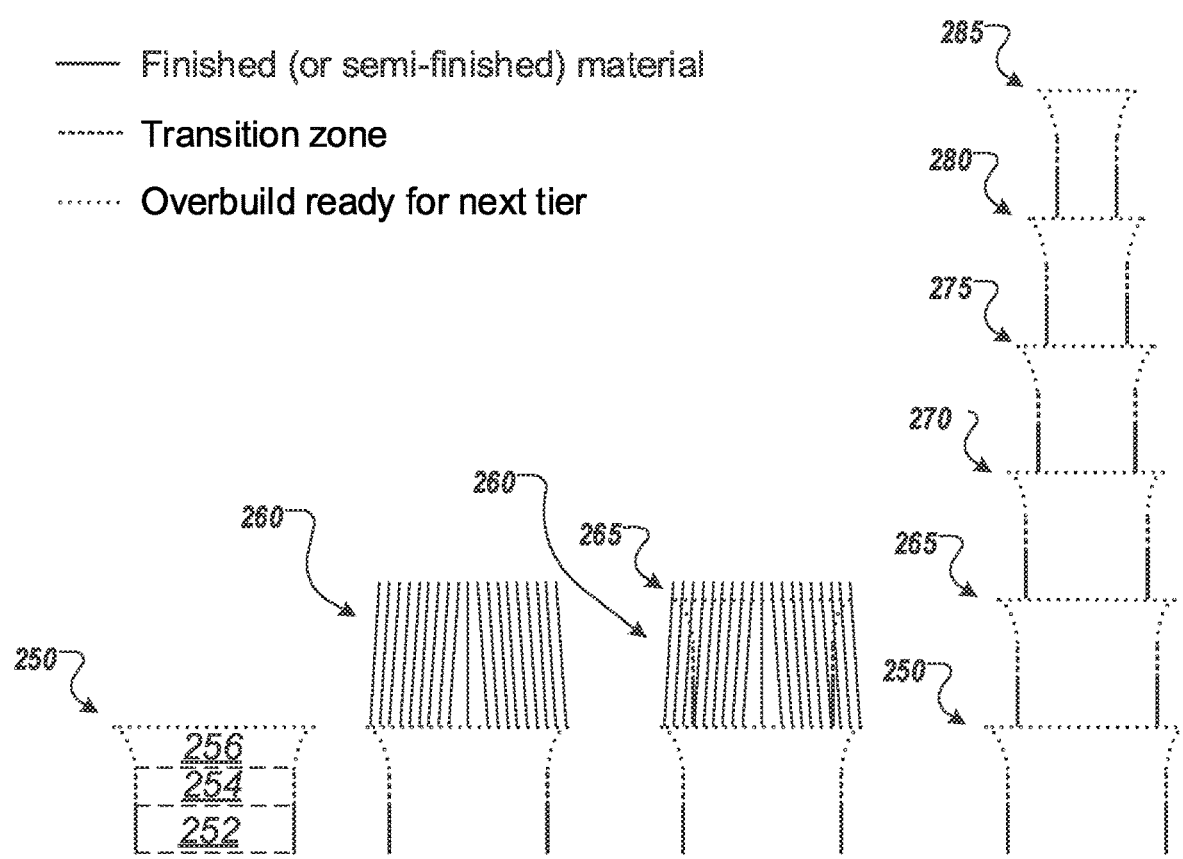
FIG. 2C shows an example of overbuilding in the additive manufacturing processes during hybrid additive and subtractive manufacturing.

FIG. 2C shows an example of overbuilding in the additive manufacturing processes during hybrid additive and subtractive manufacturing. As will be appreciated, the additive portion of the manufacturing will need to deposit enough material to fill the entire 3D space the final part will occupy, plus some extra amount beyond this 3D space to provide the material that is machined away by the SM processes of the hybrid manufacturing. An advantage of hybrid manufacturing is that only a small amount of extra material (in relation to the material needed to form the part) needs to be deposited, thus saving material in the manufacturing process.

The small amount of extra material needed can be defined by producing an enlarged version of the part's geometry to be used for the AM builds. This can be done by producing an enlarged version of the 3D model of the part's geometry (e.g., an outward offset of a B-Rep of the part) to form a 3D model of the structure to be built by the AM processes (e.g., a B-Rep of the AM version of the part, before SM processing) and/or by modifying the toolpath specification(s) created for the AM processes from the 3D model of the part's geometry. In any case, the enlarged version of the 3D model of the part's geometry may not be sufficiently large to both support the higher tier and provide enough material in the correct location (after any movement of distortion resulting from the AM build of the higher tier) for the SM processes. Note that this can be the case regardless of whether or not the AM processes allow a small amount of overhang when depositing material on top of a lower object.

FIG. 2C shows an example in which a first tier 250 includes a finished (or semi-finished) portion 252, a transition zone 254, and an overbuild portion 256 that is ready for the next tier. Note that the sizes of these different regions of the part are exaggerated in FIG. 2C in the interest of clarity in this disclosure, but even so, the overbuild portion of each tier will often be tapered out, as shown. In any case, the overbuild portion 256 of the first tier 250 needs to be large enough to support the AM deposit of material 260 in the next AM build of the next stage. And the AM deposit of material 260 needs to be large enough that the SM process(es) in that next stage can cut away material to form a second tier 265.

Moreover, the AM deposit of material that formed the first tier 250 needs to be large enough that, after any movement or distortion caused by the AM deposit of material 260 on top of the first tier 250, there is still enough material in the correct locations in the first tier 250 to allow the SM processes to cut the correct final geometry of the part. Thus, the manufacturing plan can be formulated by performing the numerical simulation(s) described in this document to define finished (or semi-finished) portions, transition zones (corresponding to the overlaps), and overbuild portions for each of multiple tiers 250, 265, 270, 275, 280, 285. Note that, in FIG. 2C, finished (or semi-finished) portions of the tiers are represented by solid lines, transition zones for the tiers are represented by dashed lines, and overbuild portions are represented by dotted lines. And the manufacturing plan can define these different portions of the part to be built during the hybrid manufacturing process by producing one or more 3D model's and/or one or more toolpath specifications (e.g., for both AM and SM processes) with suitable overbuilds and/or overlaps (note that an overlap can be the combination of a transition zone and an overbuild amount left behind) for the different tiers of the part.

Returning again to FIG. 1, the CAD program(s) 116 can perform the operations described in this document to formulate a manufacturing plan for the 3D model 132 of the part. This can include preparing the 3D model 132 for manufacturing the physical structure of the part by generating toolpaths for use by the hybrid additive and subtractive manufacturing system to manufacture the part. For example, the 3D model 132 can be used to generate a toolpath specification document 160, which can be sent to the single AM+SM machine 170 and used to control operation of one or more AM tools 176 and one or more SM tools 172, as described in this document.

This can be done upon request by the user 190, or in light of the user's request for another action, such as sending the 3D model 132 to the hybrid additive and subtractive manufacturing system, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

Further, in some implementations, the computer 110 is integrated into the CNC machine 170, and so the document 160 is created by the same computer that will use the document 160 to manufacture the part 180. Thus, in some implementations, the hybrid additive and subtractive manufacturing system includes the computer 110 and can perform the techniques described in this document to optimize the manufacturing strategy for the part, and do final inspection of the part (with suitable measuring devices, including in-process measuring devices) all together in one system, and potentially all together in a single machine 170. The toolpath specification document 160 (e.g., a numerical control (NC) program of an appropriate format) includes one or more toolpath specifications that cause the CNC machine 170 to use the AM tool(s) 176 and SM tool(s) 172 to perform the hybrid manufacturing process manufacture the physical object 180 (corresponding to the 3D model 132).

Figure 3B:
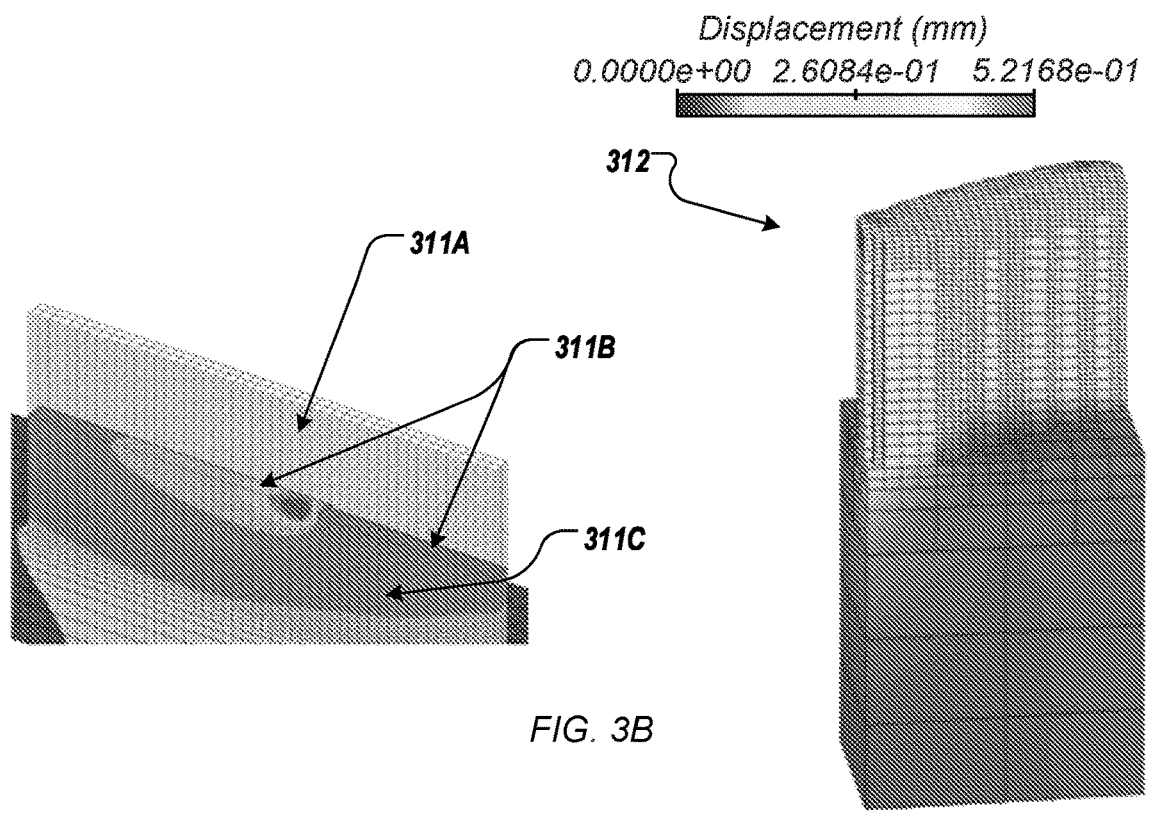
Figure 3A:
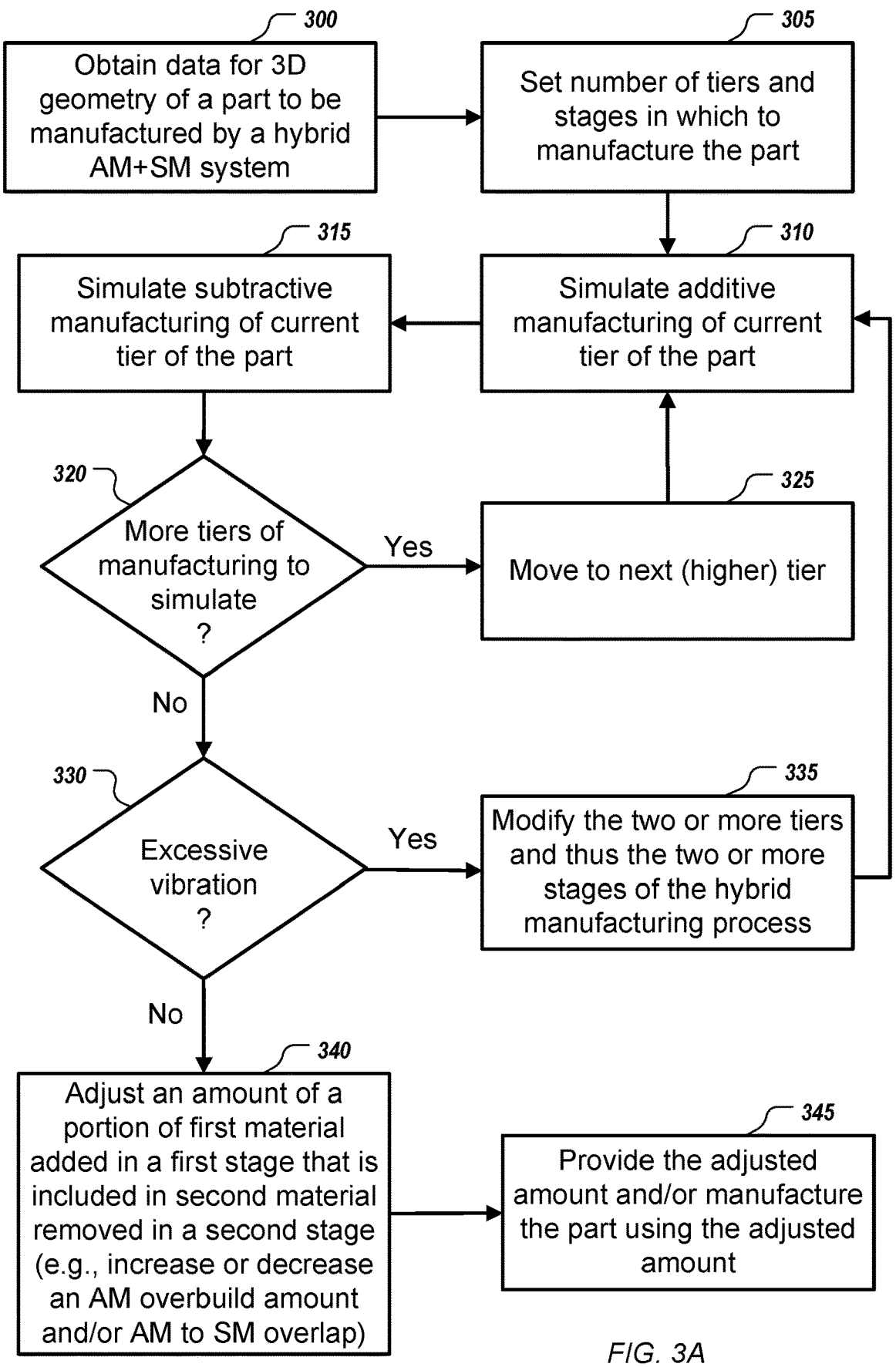
FIG. 3A shows an example of a process to alter a manufacturing plan based on numerical simulation of hybrid additive and subtractive manufacturing of the structure.

FIG. 3A shows an example of a process to alter a manufacturing plan based on numerical simulation of hybrid additive and subtractive manufacturing of a structure. Data for three dimensional geometry of a part to be manufactured is obtained 300, e.g., by CAD program(s) 116. The part is to be manufactured from a material by a hybrid additive and subtractive manufacturing system including an additive manufacturing tool and a subtractive manufacturing tool, as described in this document. Further, the data can include a 3D model (e.g., a B-Rep) of the part (or a portion thereof), one or more toolpath specifications for the AM tool and/or the SM tool, which toolpath specification(s) have been generated from the 3D model of the part, e.g., based on input regarding cutting conditions/parameters, or both 3D model and toolpath specification data.

The part can be an aerofoil, a blisk, a turbine rotor/wheel, or a portion of such (e.g., one or more blades or vanes to be built on a hub). The material can be stainless steel, nickel, titanium, aluminum, or one or more alloys thereof. The additive manufacturing tool can be a laser deposition tool, or an electric arc tool, which are usable with powder or wire material feedstock. The subtractive manufacturing tool can be a 2.5-axis, a 3-axis, or a 5-or-more-axis cutting tool. As will be appreciated, other parts (or portions thereof), materials, and tools can also be used with the systems and techniques described in this document, where 3D parts are built from raw material (generally powders, liquids, suspensions, or molten solids) using additive manufacturing in combination with subtractive manufacturing.

In any case, the part is to be manufactured by the hybrid additive and subtractive manufacturing system using a manufacturing process composed of a series of two or more stages, where each of the two or more stages includes adding the material with the additive manufacturing (AM) tool and removing some of the material with the subtractive manufacturing (SM) tool to build a next tier of the part. In some implementations, the number of tiers (and thus the number of stages in which to manufacture the part) is set 305 to a default initial number, such as a default of two or three tiers/stages. In some implementations, the number of tiers is predefined by the user or by another process. For example, the initial number of tiers can be specified by the data, e.g., the obtained 300 data can include toolpath specifications for the AM tool and the SM tool that already divide the part manufacturing into a predefined number of tiers (of the part) and thus stages (of the manufacturing of the part).

In some implementations, the number of tiers can be modified in order to balance between productivity and quality for the manufacturing process. Note that fewer tiers are preferred since more tiers means more transitions between different tools. More transitions between using the AM tool(s) and the SM tool(s) means more interruptions of the manufacturing process, which generally decreases the productivity of the manufacturing process. However, depending on the part to be manufactured and the available SM tools, too few tiers can result in undesirable vibration during machining by an SM tool, which can reduce the quality of the manufactured part.

In general, the number of tiers to use will depend on the strength of the material, the 3D geometry of the part (e.g., the shapes and sizes of different portions of the part in relation to each other, such the length to width ratios of the blades and the spacing between the blades), and cutting conditions/parameters for the manufacturing. The cutting conditions/parameters can include information regarding one or more different cutting tools and/or cutting data for the one or more different cutting tools usable as the SM tool in the hybrid manufacturing process. The information of the cutting conditions/parameters can include details of an SM tool to be used (tool size, shape, and number of flutes, if any), depth of cut, feed rate, spindle speed, plunge rate, and step-over and step-down, plus workpiece material (e.g., nickel, titanium, aluminum, or one or more alloys thereof) and tool material (e.g., carbide) specifications. In some implementations, some or all of the cutting conditions/parameters are obtained from another source (e.g., a provider of the hybrid manufacturing system).

Beginning with the lowest tier, i.e., beginning with the first stage, the additive manufacturing of the current tier of the part is simulated 310, e.g., by CAD program(s) 116, in accordance with the data and a physical property of the material. This can involve using finite element analysis (or other numerical simulation techniques) to simulate thermal effects of adding the material in the current stage. The numerical simulation 310 can involve simulating thermal effects at an interface between the current tier and an object on which the AM tool is building (e.g., a previous tier from a preceding stage), at a global part level, or both (e.g., simulating thermal effects at both the global part level and at the interface between the deposited material added in first and second stages of the manufacturing).

FIG. 3B shows visual representations of numerical simulation(s) that can be performed to streamline AM workflow and formulate a manufacturing plan to get from a 3D model of a part to successfully 3D printed parts with first time right manufacturing. The examples of FIG. 3B show a simulation with inactive elements 311A, evolving interface 311B, and active elements 311C, and also a simulation of displacement 312. Returning to FIG. 3A, the thermal effects that are simulated 310 can include movement or distortion of the part being manufactured, as caused by the use of the AM tool. In general, any suitable information (e.g., test data) that impacts how the part will move or distort (during deposition of the material to form the current tier of the part) can be used to generate a heat and force model for use in the numerical simulation 310 of the AM tool(s) building the workpiece that is then cut using the SM tool(s).

The subtractive manufacturing of the current tier of the part is simulated 315, e.g., by CAD program(s) 116, in accordance with the data and the physical property of the material. This can involve using finite element (FE) analysis (or other numerical simulation techniques) to simulate vibration and/or thermal effects of removing the material in the current stage, where the removing of material includes blending between the current tier and an object below the current tier (e.g., a previous tier from a preceding stage). The numerical simulation 315 can involve simulating thermal effects at an interface between the current tier and the object below the current tier, at a global part level, or both. Note that the material can be removed from the top interface (as well as from the sides) of the previous tier from the preceding stage (or other object below the current tier).

The numerical simulation 315 can involve simulating vibration experienced by the SM tool during removal of material from the current tier and the object below the current tier, which includes the blending between the current tier and the object below the current tier. The simulated 315 vibration can be in accordance with the cutting conditions/parameters, and can include assessing deflections experienced by the SM tool and the workpiece as material is cut from the workpiece by the SM tool. In general, any suitable information (e.g., test data) that impacts how the tool and/or the workpiece will move during cutting can be used to generate a force model of the force that the SM tool(s) exert on the workpiece for use in the simulation 315. Note that the shorter and stronger the SM tool is, the less vibration there will be in the tool during the subtractive manufacturing (shorter tools are naturally stiffer).

A check 320 is made, e.g., by CAD program(s) 116, to see if more tiers of manufacturing still need to be simulated. If so, the process moves 325 to the next (higher) tier to simulate 310, 315 the AM and SM tools building that next tier. In the example shown, all stages of the manufacturing are simulated before any changes to the manufacturing plan are made. But as will be appreciated, this is not required. In some implementations, only one or two of the two or more stages are simulated before the results of the simulations are assessed to determine if changes to the manufacturing plan are needed.

In some implementations, a check 330 is made, e.g., by CAD program(s) 116, for excessive vibration in the numerical simulation results from numerical simulation 315. Machining vibrations (also referred to as chatter) correspond to the relative movement between the workpiece and the cutting tool, which produces waves on the machined surface. The amount of vibration considered excessive can be determined by analysis of data generated from a cutting force(s) and cutting dynamic(s) model. A model of cutting forces and dynamics can be used to predict the cutting forces and dynamic response (including vibrations, chatter, etc.) of the tool and workpiece while cutting. The results can be analyzed to find how much vibration creates instability during cutting.

After predicting the cutting forces and dynamics, the forces can be used to define load cases for subsequent FE simulation to validate the predicted results. The FE simulation can indicate: (1) based on the material of the workpiece, whether the resulting stresses on the workpiece itself is enough to break or damage the workpiece; (2) based on the material of the fixturing (also referred to as the workholding), whether the resulting stress on the fixturing is enough to damage or create instability in the fixturing; and (3) based on the material of the cutting tool, whether the resulting stresses on the cutting tool is enough to break or damage the cutting tool itself. Any of these three indications from the FE simulation would constitute excessive vibration that needs corrective action to resolve, such that the amount of vibration during the actual subtractive manufacturing process should not damage the workpiece, fixtureing, and/or the tool.

If the vibration is excessive, the two or more tiers, and thus the two or more manufacturing stages, can be modified 335, e.g., by CAD program(s) 116. This can involve changing the heights of two or more of the tiers and/or increasing a number of the tiers to reduce the heights all the tiers. As noted above, fewer tiers are preferred since more tiers means more transitions between the AM and SM tools. Thus, the modification 335 is done to balance productivity with issues arising from not having a suitable tool (long and strong enough) to complete the machining in a given tier. Other and/or additional modifications 335 are also possible, including adjusting 340 the amount of excess material (as described in further detail below), changing vibration frequencies by adjusting operation of the tool (e.g., spindle speed, number of teeth and relative positions, etc.), and/or changing the tool (modifying angles, dimensions, surface treatment, etc.).

The modifying 335 can be based on the available cutting tools and the design of the 3D geometry that needs to be machined with those cutting tools to select the number of tiers and/or the height of each of the tiers. Manufacturing of the part is simulated 315 to see how much vibration there actually is, and the tiers are modified 335 based on the numerical simulation results, including changing the number tiers (and thus manufacturing stages) to use, and/or changing the height(s) of one or more of those tiers. Thus, the process can figure out how and where to split the part into tiers given the dimensions of the part, the available tools, and the simulated vibration experienced during manufacturing.

In addition, the process can adjust 340, e.g., by CAD program(s) 116, an amount of a portion of first material added in a first stage that is included in second material removed in a second stage. FIG. 3C shows visual representation of the adding and removing of respective portions of the material used to manufacture two tiers of a part. The simulating 310 can include adding first material 310A using the AM tool in the first stage of the two or more stages, and the simulating 315 can include removing second material 315B using the SM tool in the second stage of the two or more stages, where the first stage precedes the second stage, and the second material 315B includes the portion 315B1 of the first material 310A, resulting in a partially finished (or semi-finished) second tier 316B on top of the fully finished (or semi-finished) first tier. Moreover, the simulating 310 can include adding third material 310B using the AM tool in the second stage of the two or more stages, and the simulating 315 can include removing fourth material 315A using the SM tool in the first stage of the two or more stages, resulting in a partially finished (or semi-finished) first tier 316A, where the first material 310A includes the fourth material 315A, and the second material 315B includes a portion 315B2 of the third material 310B.

The adjusting 340 involves adjusting the amount of the portion 315B1 of the first material 310A included in the second material 315B based on the results of the simulating 310, 315, in accordance with the physical property of the material, to prevent deviation of the part from the three dimensional geometry that results in not enough material being available for the SM operation(s) including the blending between the tiers. Thus, the amount of extra material to leave behind can be optimized to reduce material usage and/or manufacturing time. Factors affecting how much non-machined portion of one tier to leave behind for blending into the machined portion of the next higher tier can include the strength of the material, the 3D geometry of the part (e.g., the shapes and sizes of different portions of the part in relation to each other, such as the length to width ratios of the blades and the spacing between the blades), and cutting conditions/parameters for the SM operation(s).

Thus, the process makes sure there will be enough material left on the part being manufactured to blend the first tier with the second tier during the subtractive manufacturing. The thermal effects of the hybrid manufacturing process can cause the part to move or distort, which can negatively impact the quality of the fully manufactured part. By leaving enough material on the workpiece during the subtractive manufacturing in the first manufacturing stage, the workpiece will be able to absorb the heat during the additive manufacturing in the second manufacturing stage without distorting so much that there is not enough material available to blend the two tiers together during the subtractive manufacturing in the second manufacturing stage. Note that the adjusting 340 can include increase or decrease an AM overbuild amount and/or AM to SM overlap.

In the case of SM overlap adjustment, the adjusting 340 can include decreasing an amount of the fourth material 315A and increasing the portion 315B1 of the first material 310A included in the second material 315B. For example, when the material is determined by the numerical simulation to not be strong and stable enough to prevent distortion that affects the quality of the manufactured part, more material needs to be left behind to absorb the heat from AM and still have enough material in the correct location for blending during SM. Thus, the blending distance is increased (e.g., increase overlap 255 in FIG. 2B) by decreasing the amount of the fourth material 315A (e.g., lowering the upper limit of the machining process 222 in FIG. 2B) and increasing the portion 315B1 of the first material 310A included in the second material 315B (e.g., lowering the lower limit of the machining process 232 in FIG. 2B).

Moreover, the adjusting 340 can include increasing an amount of the fourth material 315A and decreasing the portion 315B1 of the first material 310A included in the second material 315B. For example, where the material is determined by the numerical simulation to be strong and stable enough that there will be no distortion of the material of the workpiece, less material need be left behind for blending. Thus, the blending distance is decreased (e.g., decrease overlap 255 in FIG. 2B) by increasing the amount of the fourth material 315A (e.g., raising the upper limit of the machining process 222 in FIG. 2B) and decreasing the portion 315B1 of the first material 310A included in the second material 315B (e.g., raising the lower limit of the machining process 232 in FIG. 2B). Thus, the adjusting 340 can involve changing toolpath specifications for the SM machining used in the first and second stages.

In the case of AM overbuild amount adjustment, the adjusting 340 can include increasing or decreasing an overbuild amount of the first material 310A (in relation to the three dimensional geometry of the part) to be added using the additive manufacturing tool in the first stage of the two or more stages in addition to changing the SM amounts 315A, 315B to leave behind a sufficient amount of non-machined material in one tier to ensure there is enough material in that tier on which to AM build the next higher tier and SM machine the part to produce a high quality manufacturing result. The lateral extent of this overbuild amount will depend on the AM process and the material being used.

Changing 340 the AM overbuild amount can be done by changing toolpath specifications for the AM build, or by changing 3D geometry of a model of the AM build. For example, the process can include an automatic CAD geometry modification step to produce the data as a staged deposition model with an enlarged version of the part's geometry used for the AM builds in the respective tiers, and the amount of the enlargement needed for the AM builds in the respective tiers (relative to the CAD model of the part) can be adjusted 340 based on the numerical simulation results. In other words, the numerical simulation indicates the amount of enlargement needed for a pre-distorted AM deposition shape for the first manufacturing stage, such that after distortion caused by AM in the second manufacturing stage, there will still be enough material (beyond the exterior surfaces of the CAD model of the part) to complete the SM in the second manufacturing stage. Note that the enlargement can be vertically upward (in addition to laterally outward) from the part's geometry, such as when at least part of the top of the added first material 310A needs to be SM machined away (in the SM process of the first stage) to create a suitable surface on which to add the third material 310B (in the AM process of the second stage).

In some implementations, the size of the transition zone and an extent of an overbuild amount are adjusted 340 responsive to the numerical simulation 310, 315. In some implementations, the simulation of thermal effects is based on different properties for different tiers. For example, while this detailed description focuses on manufacturing with a single material, it will be appreciated that more than one material can be used in the hybrid system, e.g., with either with a single AM tool 176 or more than one AM tool 176, and the part design and/or manufacturing plan may call for different materials to be used in different portions of the part. Thus, the simulation of thermal effects can take into account different materials (with different physical properties) being used in one tier versus the object on which the one tier is built, e.g., a lower tier (or blade root) may be a metal that is more thermally stable than the higher tier placed thereon.

In general, feedback from numerical simulation of the combination of additive and subtractive manufacturing can be used to adjust a manufacturing plan so as to improve the manufacturing process and/or improve the quality of the manufactured structure. The number of manufacturing stages and/or the overlap between additive subtractive manufacturing within and between stages can be modified to prevent instability and distortion during additive deposition, ensure uniform material removal during machining, and/or provide stability against vibration and machining dynamics during SM machining. Thus, the process of manufacturing planning is improved by simulating distortion, and the proportion of material added and removed is altered to ensure consistent and accurate manufacturing of parts with the hybrid manufacturing process.

The adjusted amount and/or the modified tiers/stages can be provided 345, e.g., by CAD program(s) 116, for use in manufacturing the part by the hybrid additive and subtractive manufacturing system. In some implementations, the process includes manufacturing 345 the part with the hybrid additive and subtractive manufacturing system using the adjusted amount and/or the modified tiers/stages. For example, the process can be performed by CAD program(s) 116, which can be encoded in at least one non-transitory computer-readable medium and can be run on one or more computer processing apparatus included in the hybrid additive and subtractive manufacturing system. Thus, the providing 345 can involve passing the adjusted amount and/or the modified tiers/stages to another part of the program that handles the manufacturing. Alternatively or additionally, the providing 345 can involve saving or storing the adjusted amount and/or the modified tiers/stages to a computer-readable medium for later retrieval for use in manufacturing.

In addition, in some implementations, the simulation 310, 315 includes simulating machining of blades or vanes that are built on top of blade roots included as integral portions of a hub. For example, FIG. 3D shows a 3D model 350 of a portion of a turbine rotor having a hub portion 360 and blades 370 designed to operate in a high temperature environment (e.g., 1000 to 5000 degrees F.), and FIG. 3E shows a proof-of-concept manufactured structure that shows partially manufactured blades 380 on a block 390 representing the hub of a turbine rotor. In high temperature environments, e.g., the hot end of an engine for an airplane or other vehicle, there is a lot of stress where the blades meet the hub in the turbine rotor. So this critical portion of the turbine rotor may fail more often than other portions. Such a failure may be more likely to destroy the engine than a failure farther out on one of the blades 370.

To address this issue, the design and/or manufacturing plan for the part can include blade roots as integral parts of the hub. For example, a blade root 362 is formed as part of the hub portion 360 from the same material, and a blade 372 is built thereon using the tiered and simulation-informed approach to hybrid AM+SM manufacturing. This use of blade roots integral to the hub increases the strength of the critical portion of the turbine rotor, which can be especially important depending on an arrangement of thermal zones within the part during use. Any issue of weakness at the connection between an initial tier AM built onto a cylindrical workpiece is either eliminated, or displaced from the more critical part of the turbine rotor, which is then less of an issue for the controlled part. In some implementations, the blades 370 are built on a premachined surface (of an overbuilt preform) to remove stress concentrations from the blade/hub interface.

Each of the blades 370 can be made from the same material or a different material than the hub portion 360. Research into multi-material deposition is ongoing, but the systems and techniques described in this document will be applicable to new developments in deposition of multiple materials, as the described simulation techniques will be applicable to assist in choosing materials and portions thereof when developing a manufacturing plan in conjunction with designing the part based on its performance and operational requirements. For example, in addition to the blades being made from a different material than the hub, various parts of the hub and/or various parts of the blades can be made from different materials. Note that one material may be different than another material in that they are alloys of the same set of materials, but using different amounts of each.

In some implementations, the numerical simulation of thermal effects includes assessing thermal zones (e.g., based the part's location within an engine) to help in determining an optimal height for the blade roots, given the material(s) to be used for the rooted hub and the blades. The numerical simulation of thermal effects can also include help in determining which materials to use where, such as using more temperature-resistant materials in the hottest portions of the part, while also taking account of the performance and operational requirements for the part.

In some implementations, the hub with blade roots is manufactured by first casting or forging (hot or cold) an approximation of the design, and then potentially performing traditional SM machining operations. In some cases, after forging or casting, the hybrid manufacturing process can begin without initial SM machining operations to prepare the surface(s) for the first deposition. For example, precision forging or casting can create a surface that is ready for the first deposition. In some cases, one or more surfaces of the initial workpiece are prepared for the first deposition by performing a face milling using tradition SM machining operations, and then subsequently proceeding to the hybrid manufacturing process.

In some implementations, the hub with blade roots is manufactured to include a predefined interface (flat or close to flat) on the top of each of the blade roots, which facilitates AM building of the blades on the blade roots. For example, a slight curvature can be added to each blade root's surface (on which the initial deposition will be performed) where the curvature is conformal to the starting hub and concentric with the hub's center of rotation (at a smaller diameter that intersects/cuts the blade to form the root). Making the starting shape conform to the hub shape can reduce deposition errors, but can also make the CNC motion of the deposition process more complex.

Keeping the interface between the blade roots and the blades as a flat plane (in the X,Y dimensions of the CNC deposition) may be preferred in some implementations, as this simplifies the deposition process. But in some cases, the flat surface of the blade roots can be an angled plane. In general, the use of blade roots (integral to the hub) and the design of the interface between the blade roots and the blades involves trade-offs between simple or complex machine motion, which leads to more complex deposition and possibly more deposition inefficiency (e.g., powder loss when using a Laser plus powder DED process). These trade-offs can be taken into account while gaining the benefits of using blade roots, including (1) reducing the risk of failure in this critical zone on a blisk component by using the known and stable process of traditional SM close the hub, and moving the high heat energy used during deposition away from the hub, and/or (2) simplifying the deposition process by reducing the complexity of machine motion during the initial deposition stage.

In the proof-of-concept structure shown in FIG. 3E, the block (representing the hub of a turbine rotor) was roughed to form an initial workpiece with blade roots, including a roughed blade root 391. Then, only a proper subset of the AM and SM processes (in three stages of AM+SM hybrid manufacturing) were performed to build the blades 380. A first blade portion 381 shows the result of AM build 1 on the bladed root 391. A second blade portion 382 shows the result of AM build 1 and SM semi-finishing 1 (manufacturing stage 1 complete). A third blade portion 383 shows the result of AM build 2. A fourth blade portion 384 shows the result of AM build 1+SM semi-finishing 1, and AM build 2+SM semi-finishing 2 (manufacturing stage 2 complete), plus AM build 3. Finally, a fifth blade portion 385 shows the result of all three manufacturing stages to build the blades 380 in three tiers on the bladed roots.

However, these details of the design and manufacturing plan are not required. In some implementations, no blade roots are used. For example, a close approximation of a cylindrical hub (or disk) can be manufactured by casting or forging (hot or cold), and the initial AM build can be on this initial workpiece. This can still reduce total machine cost and time as compared to traditional SM, but there can be part integrity issues at the interface between the blade and the hub (or disk) that risks introducing one or more stress concentration zones. Also, there will still be a significant amount a SM machining required to get the hub (or disk) to its final shape.

But this approach can still be appropriate for some types of parts, subject to their structural strength requirements at the interface between the blades and the hub (or disk). Also, the stress concentration issues can be reduced or removed with proper process control, e.g., heating the hub before the initial deposition operation to prevent thermal shock, which can cause cracking or weakness in the joint and lead to future part integrity issues during operation. Thus, with proper process control and understanding of the power source and process, good structural integrity can still be achieved with this approach.

In some implementations, a flat (or close to flat) interface is not used. For example, rather than blade roots, the initial AM build can be on the final (or close to final) shape of a hub, which can be readily machined from a round feedstock by turning. This can reduce the total amount of manufacturing time for some types of parts, but with the other approach above, there can be part integrity issues at the interface between the blade and the hub (or disk). Thus, this approach can be used for some parts, subject to their structural strength requirements at the interface between the blades and the hub (or disk), how complex the surface of the hub (or disk) is, on which the AM build will take place. Note that there can be tool accessibility issues for both approaches, which should be taken into consideration as well, depending on how long, twisty, and close together the blades are.

For example, to determine a suitable, hybrid tiered manufacturing plan for a blade 372, the accessibility issues can be addressed based on the shape of the blade 372 and its flanking blades 371, 373. Shrouds for the flanking blades 371, 373 (e.g., outward offsets of B-Reps of the blades 371, 373) can be generated and used for collision checking to define a working volume for manufacturing blade 372, i.e., the 3D space between the two shrouds for the flanking blades 371, 373. The process can then generate toolpath(s) for the blade 372 within that working volume, subject to inputs (e.g., user inputs) regarding the type of SM operation (roughing, semi-finishing, or finishing) and the SM tool(s) available for that SM operation, which will depend in part on the size and/or shape of the blade 372. This toolpath information can be taken into account during the numerical simulation of the hybrid manufacturing process to identify any tool accessibility issues.

Figure 4:
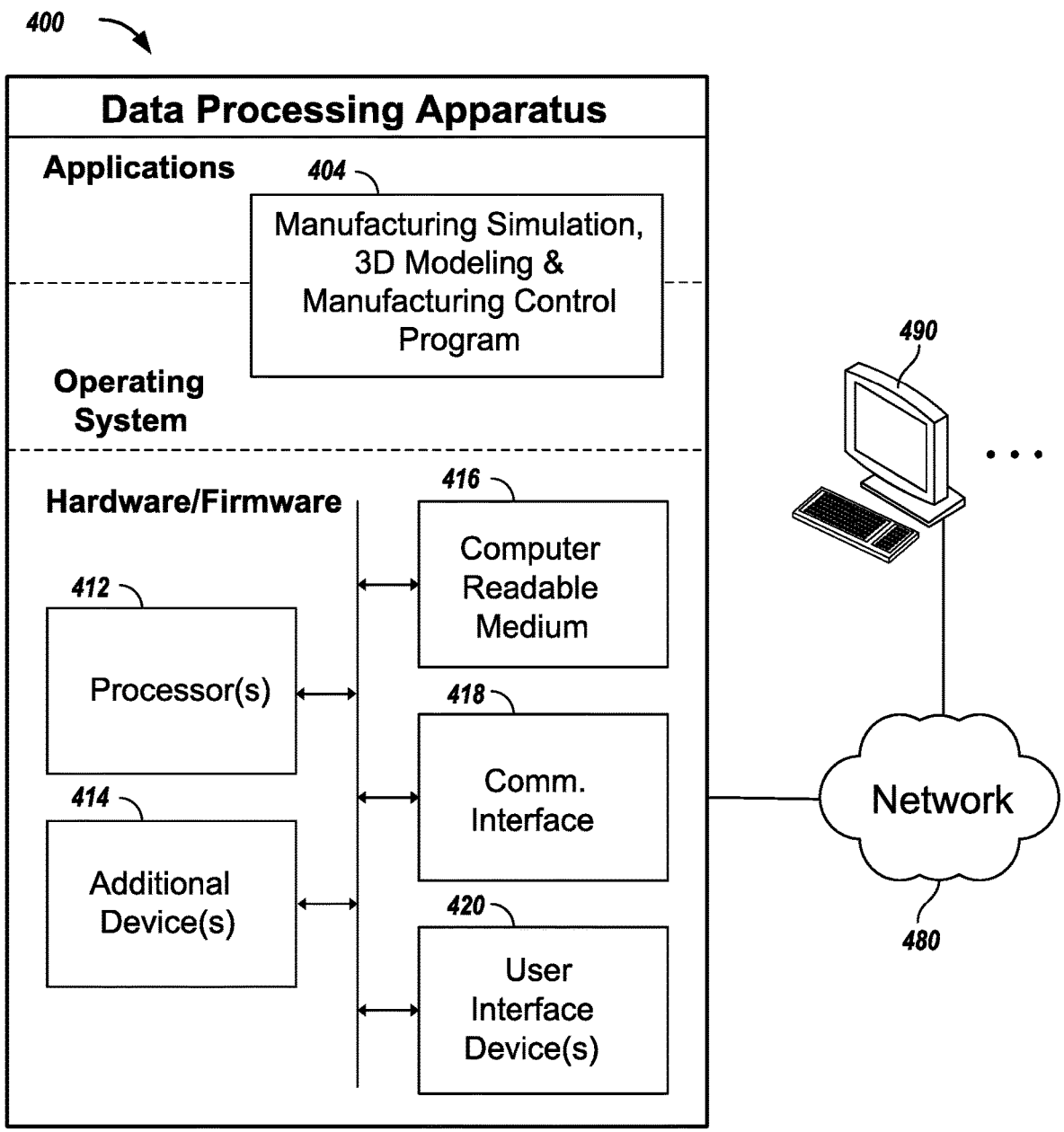
FIG. 4 is a schematic diagram of a data processing system usable to implement the described systems and techniques.

FIG. 4 is a schematic diagram of a data processing system including a data processing apparatus 400, which can be programmed as a client or as a server. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications tier and an operating system. These can include executable and/or interpretable software programs or libraries, including tools and services of a manufacturing simulation, 3D modeling and manufacturing control program 404 that implements the systems and techniques described in this document. The number of software modules used can vary from one implementation to another. Moreover, the software modules can be distributed on one or more data processing apparatus connected by one or more computer networks or other suitable communication networks.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses the communication interface 418 to communicate with one or more computers 490, for example, over the network 480. Examples of user interface devices 420 include a display, a camera, a speaker, a microphone, a tactile feedback device, a keyboard, a mouse, and VR and/or AR equipment. The data processing apparatus 400 can store instructions that implement operations associated with the program(s) described herein, for example, on the computer readable medium 416 or one or more additional devices 414, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video ptier, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A computer-implemented method comprising:
obtaining data for three dimensional geometry of a part to be manufactured from a material by a hybrid additive and subtractive manufacturing system comprising an additive manufacturing tool and a subtractive manufacturing tool using a manufacturing process comprising a series of two or more stages, each of the two or more stages comprising adding the material with the additive manufacturing tool and removing some of the material with the subtractive manufacturing tool;
simulating, in accordance with the data and a physical property of the material, at least a portion of the manufacturing process that includes adding first material using the additive manufacturing tool in a first stage of the two or more stages and removing second material using the subtractive manufacturing tool in a second stage of the two or more stages, wherein the first stage precedes the second stage, wherein the second material includes a portion of the first material, wherein removing the second material comprises blending between the material added in the first and second stages, and wherein the simulating comprises simulating thermal effects of adding and removing the material in the first and second stages;
adjusting an amount of the portion of the first material included in the second material based on results of the simulating, in accordance with the physical property of the material, to prevent deviation of the part from the three dimensional geometry, during the portion of the manufacturing process, that results in not enough material being available for the blending; and
manufacturing the part by the hybrid additive and subtractive manufacturing system using the adjusted amount of the portion of the first material included in the second material for blending between material added in the first and second stages.

2. The computer-implemented method of claim 1, wherein the portion of the manufacturing process comprises adding third material using the additive manufacturing tool in the second stage of the two or more stages and removing fourth material using the subtractive manufacturing tool in the first stage of the two or more stages, the first material includes the fourth material, the second material includes a portion of the third material, the simulating comprises simulating vibration experienced during at least the removing of the second material, and the method comprises:
 modifying two or more tiers of the part to be manufactured and thus the two or more stages responsive to the vibration being excessive.

3. The computer-implemented method of claim 2, wherein simulating vibration comprises simulating instability during cutting based on predicted cutting forces and dynamic response.

4. The computer-implemented method of claim 1, wherein adjusting the amount of the portion of the first material included in the second material comprises increasing an overbuild amount of the first material, in relation to the three dimensional geometry of the part, to be added using the additive manufacturing tool in the first stage of the two or more stages.

5. The computer-implemented method of claim 1, wherein the portion of the manufacturing process comprises adding third material using the additive manufacturing tool in the second stage of the two or more stages and removing fourth material using the subtractive manufacturing tool in the first stage of the two or more stages, the first material includes the fourth material, the second material includes a portion of the third material, and adjusting the amount of the portion of the first material included in the second material comprises decreasing an amount of the fourth material and increasing the portion of the first material included in the second material.

6. The computer-implemented method of claim 1, wherein the part is a turbine rotor comprising a hub and blades designed to operate in a high temperature environment, and the simulating comprises simulating machining of the blades built with the additive manufacturing tool, in the two or more stages, on top of blade roots included as integral portions of the hub.

7. The computer-implemented method of claim 1, wherein the hybrid additive and subtractive manufacturing system comprises one or more computer processing apparatus including at least one non-transitory computer-readable medium encoding a computer aided design program operable to perform the obtaining, the simulating, the adjusting, and the manufacturing.

\* \* \* \* \*